United States Patent [19]

Fuchs, Jr.

[11] E Re. 29,593

[45] Reissued Mar. 28, 1978

[54] PRODUCTION OF MULTIPLE ELONGATED PRODUCTS SUCH AS WIRE

[75] Inventor: Francis Joseph Fuchs, Jr., Princeton Junction, N.J.

[73] Assignee: Western Electric Co., Inc., New York, N.Y.

[21] Appl. No.: 781,024

[22] Filed: Mar. 24, 1977

Related U.S. Patent Documents

Reissue of:

[64] Patent No.: 3,964,283
Issued: Jun. 22, 1976
Appl. No.: 523,401
Filed: Nov. 13, 1974

[51] Int. Cl.[2] ..... B21B 45/02

[52] U.S. Cl. ..... 72/42; 29/419 R; 72/46; 72/60; 72/261; 72/468

[58] Field of Search ..... 29/419; 72/467, 468, 72/41, 42, 43, 46, 258, 261, 270, 60, 284

[56] References Cited

U.S. PATENT DOCUMENTS

| | | | |
|---|---|---|---|
| 2,050,298 | 8/1936 | Everett | 29/163.5 R X |
| 2,592,172 | 4/1952 | Nippert | 29/597 |
| 2,606,650 | 8/1952 | Evans | 72/46 |
| 2,870,903 | 1/1959 | Leduc | 72/42 |
| 3,394,579 | 7/1968 | Hall et al. | 72/261 |
| 3,413,832 | 12/1968 | Lang et al. | 72/42 |
| 3,540,114 | 11/1970 | Roberts et al. | 29/419 |
| 3,667,267 | 6/1972 | Fuchs, Jr. | 72/60 |
| 3,740,985 | 6/1973 | Fuchs, Jr. | 72/60 |
| 3,807,026 | 4/1974 | Takeo et al. | 29/424 X |
| 3,864,807 | 2/1975 | Schneider et al. | 29/419 R |

FOREIGN PATENT DOCUMENTS

| | | | |
|---|---|---|---|
| 711,090 | 9/1931 | France | 72/468 |
| 958,287 | 2/1957 | Germany | 72/261 |
| 1,066,977 | 10/1959 | Germany | 72/261 |
| 192,847 | 3/1964 | Sweden | 72/261 |

*Primary Examiner*—Victor A. DiPalma
*Attorney, Agent, or Firm*—A. S. Rosen

[57] ABSTRACT

A bundle of hexagonal billets, each billet being coated with a shear transmitting medium, is extruded through one form of die having a plurality of hexagonal die apertures, to produce simultaneously a plurality of individual hexagonal wires. The bundle may be extruded through another form of die having a single die aperture with a transverse cross-section registering with the transverse cross-section of the bundle, to produce simultaneously a plurality of individual hexagonal wires. In each case, the billet material is advanced against and through the die by means of frictional or viscous drag force exerted along the surface of the billet material toward the die. The foregoing operations may also be applied to drawing.

56 Claims, 16 Drawing Figures

FIG. 11
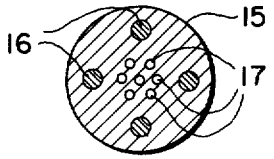
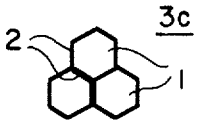
FIG. 12
FIG. 13
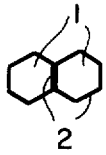
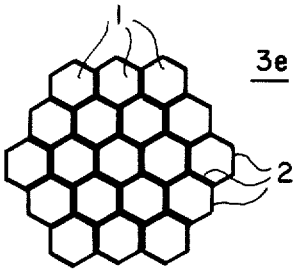
FIG. 14
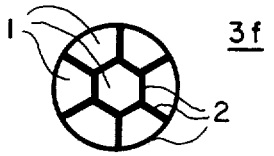
FIG. 16
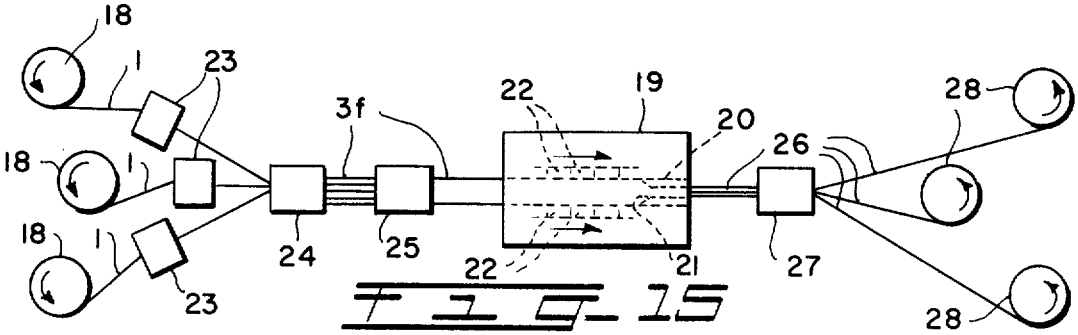
FIG. 15

PRODUCTION OF MULTIPLE ELONGATED PRODUCTS SUCH AS WIRE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates, broadly speaking, to processes and apparatus for the multiple production of elongated product such as wire. More specifically, this invention relates to the deformation of billet material, which may be of indefinite length, in a die of particular design to produce, simultaneously, a plurality of elongated products such as wire.

2. Description of the Prior Art

Simultaneous production of multiple wires from the deformation of billet material is known to those familiar with this art.

U.S. Pat. Nos. 2,050,298 (1936) and 2,077,682 (1937) both to Everett disclose assembling a plurality of discrete billets in a bundle, placing the bundle in a metallic sheath, packing the sheath around the bundle with a pulverulent or a plastic material which functions as a separating medium between the billets, drawing the sheath and the bundle enclosed thereby through a series of dies, seriatim, to reduce the sheath and the enclosed bundle, and thereafter removing the drawn sheath by chemical or electrolytic means or by stripping the drawn sheath from the wires formed by the drawn billets.

U.S. Pat. No. 3,540,114 (1970) to Roberts et al. discloses assembling a plurality of wires in a bundle, placing the bundle in a sheath, applying a thin film of lubricant to the bundle, drawing the sheath and bundle through a die to reduce the individual wires to fine filaments, and then unwrapping or chemically etching the drawn sheath to remove it from the filaments.

U.S. Pat. No. 3,394,579 (1968) to Hall et al. discloses method and apparatus for extruding a plurality of products simultaneously. In one embodiment, a single billet is extruded through a die having plural apertures. In another embodiment, a plurality of billets is simultaneously extruded through respective apertures in a die having plural apertures.

SUMMARY OF THE INVENTION

One of the objects of this invention is to provide improved apparatus and method for deforming billet material, e.g., by extrusion.

Another object of this invention is to provide improved apparatus and method for deforming billet material through a plurally apertured die, e.g., by extrusion.

A further object of this invention is to provide an improved die for the simultaneous production therethrough, e.g., by extrusion, of a plurality of wires from billet material.

Other and further objects of this invention will become apparent during the course of the following description and by reference to the accompanying drawings and the appended claims.

Briefly, the foregoing objects are attained by passing billet material through a die which may be of special design to produce simultaneously multiple products. In one embodiment, the billet material may be coated with a medium having die lubricating properties. In another embodiment, the medium may also have shear transmitting properties. For billet material comprising a bundle of polygonal billets, the die may have plural apertures, each registering with the polygonal cross-section of one of the billets, or the die may have a single aperture registering with the polygonal cross-section of the bundle, or the die may have a circular aperture to receive a bundle of billets.

BRIEF DESCRIPTION OF THE DRAWINGS

Referring now to the drawings in which like numerals represent like parts in the several views:

FIG. 11 represents a transverse section taken along the line 11—11 of FIG. 10;

FIGS. 12, 13 and 14 represent transverse sections of bundles of some alternate arrangements of hexagonal billets, individually coated with a shear transmitting medium, which bundles may be extruded according to the principles of the present invention;

FIG. 15 represents diagrammatically a layout of equipment for multiple extrusion employing a variant of techniques illustrated in other figures; and FIG. 16 represents a transverse section of a circular bundle of billets formed by passing a bundle of hexagonal billets, individually coated with a shear transmitting medium, through the rounding die of FIG. 15.

DESCRIPTION OF THE PREFERRED EMBODIMENTS

The present invention, in the preferred embodiments herein disclosed, applies certain techniques taught in U.S. Pat. No. 3,740,985 (1973) to the simultaneous extrusion of a plurality of elongated products from billet material.

U.S. Pat. No. 3,740,985 discloses coating the elongated surface of billet material with a shear transmitting medium which may, for example, be beeswax or polyethylene wax, and exerting through the shear transmitting medium a frictional or viscous drag force along the elongated surface of the billet material thereby to advance the billet material through a die to produce extruded product.

The shear transmitting medium desirably has high viscosity and shear strength, is capable of lubricating the die, provides good wetting action on the billet material, and has minimal viscosity variation with respect to pressure, temperature and shearing rate.

The means which exerts, through the shear transmitting medium, viscous drag force along the elongated surface of the billet material comprises trains of gripping element segments, each train being continuously propelled by pinion gears around a separate endless path, all of the trains of gripping element segments meeting along one length of travel from a first station upstream of a die to a second station downstream of the die and cooperating along said common length of travel to form a continuously moving train of centrally apertured gripping elements moving toward the die. The inner peripheries of the said apertures engaging the outer surface of the coating of shear transmitting medium on the billet material generate shear forces in the said medium which shear forces produce a frictional or viscous drag force along the elongated surface of the billet material to build up axial stress in the billet material and advance the billet material through the die. A pressure cylinder surrounds the centrally apertured gripping elements upstream of the die and exerts a normal pressure gradient on said gripping elements increasing toward the die, whereby a normal stress gradient is built up in the billet material increasing toward the die. These axial and normal stresses stress the billet material far above its yield strength and increase its ductility, or capacity for deformation without fracture.

Specific details of the extrusion apparatus, insofar as they do not relate to multiple extrusion and die design, are not part of the present invention. Reference should be made to U.S. Pat. No. 3,740,985 if information on such details is desired.

Figure 1:
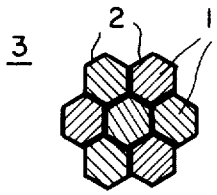
FIG. 1 represents a transverse section of a bundle of hexagonal billets individually coated with a shear transmitting medium, which bundle is to be extruded according to the principles of the present invention.

In FIG. 1, a plurality of billets 1, each having a regular hexagonal transverse cross-section and each provided along its elongated surface with a coating 2 of shear transmitting medium such as beeswax or polyethylene wax is assembled to form a bundle 3 of billet material. The billets 1 may be rods of indefinite length and, consequently, the bundle 3 may likewise be of indefinite length. Alternatively, the billets 1 may be relatively short in length and, consequently, bundle 3 may likewise be relatively short. The hexagonal transverse cross-section of each of the billets 1 has been chosen as it permits the said billets 1 to be closely packed and the thickness of the shear transmitting medium to be uniform along all facing surfaces of the billets 1 (i.e., along all billet surfaces lying below the periphery of the bundle 3). The thickness of the shear transmitting medium on the periphery of the bundle 3 is approximately one-half of the thickness of shear transmitting medium between non-peripheral facing surfaces of the billets 1.

Figure 2:
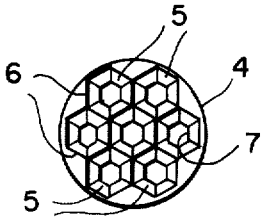
FIG. 2 represents a view in front elevation of one form of die, from the upstream or entrance end thereof, through which the bundle of billets of FIG. 1 is to be extruded.
Figure 5:
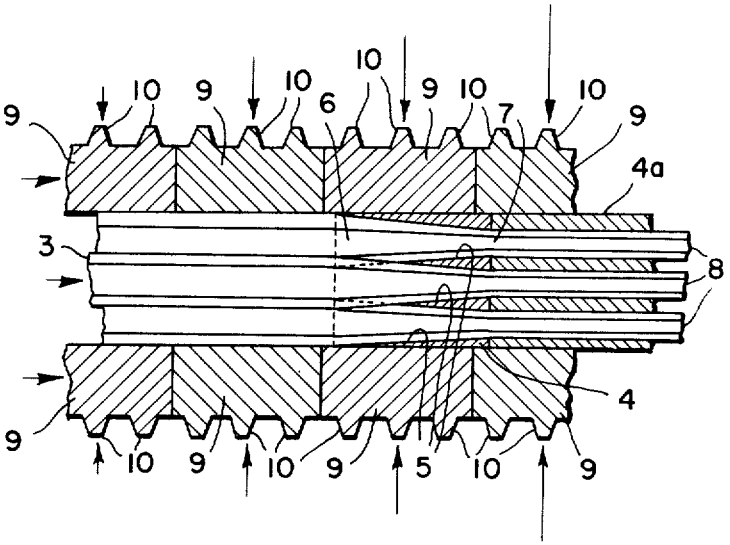
FIG. 5 represents a medial longitudinal section, taken along the line 5—5 of FIG. 4, showing the gripping elements advancing the bundle of billets through the die of FIG. 2 to produce the group of wires of FIG. 3.

Die 4, as shown in FIG. 2, has a plurality of hexagonal die apertures 5 extending therethrough, each die aperture 5 having a hexagonal inlet end 6 adapted to receive one of the billets 1 of the bundle 3, and a smaller hexagonal outlet end 7 adapted to discharge a hexagonal wire 8. The transverse cross-section of each die aperture 5 between the inlet end 6 and outlet end 7 is hexagonal, and the inlet ends 6 are contiguous to each other as shown in FIG. 2. Die 4 is supported on die stem 4a, as shown in FIG. 5, in the manner disclosed in U.S. Pat. No. 3,740,985, the said die stem 4a having apertures extending therethrough in registry with die apertures 5 of die 4.

Figure 3:
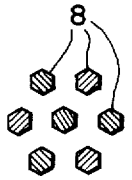
FIG. 3 represents a transverse section of the group of hexagonal wires produced by extruding the bundle of billets of FIG. 1 through the die of FIG. 2.

When the bundle 3 of hexagonal billets 1 is passed through the die 4, the billets 1 are simultaneously deformed in their respective hexagonal die apertures 5 thereby simultaneously producing a plurality of hexagonal wires 8 as shown in FIG. 3.

Figure 4:
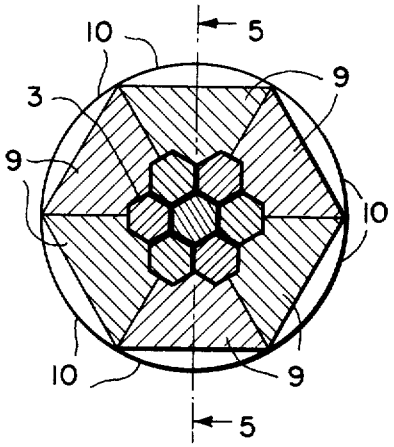
FIG. 4 represents a transverse section of the bundle of billets of FIG. 1 peripherally surrounded by gripping elements which apply a frictional drag force along the surface of the bundle, parallel to the longitudinal axis thereof, through the shear transmitting medium which coats the billets, to advance the bundle through the die of FIG. 2.

Advantageously, as shown in FIG. 5, the bundle 3 of billets 1 is advanced to and extruded through die 4 by means of gripping element segments 9 propelled toward and past the die 4 by pinion gears (not shown) engaging teeth 10 on the exterior surface of the said gripping element segments 9, in the manner taught in U.S. Pat. No. 3,740,985. The gripping element segments 9 cooperating as a train of gripping elements constitute a pressure chamber surrounding the bundle 3 and exert, through the coating 2 of shear transmitting medium, a frictional or viscous drag force along the surface of the bundle 3 thereby advancing the said bundle 3 against and through die 4. The inner surfaces of gripping element segments 9 are configured so as to match the peripheral profile of bundle 3, as shown in FIG. 4. At equilibrium, the gripping elements exert a frictional or viscous drag force through the shear transmitting medium along the surfaces of the billets 1 on the periphery of bundle 3 and the peripheral billets 1 exert, through the interposed shear transmitting medium, the same frictional or viscous drag force along the surfaces of those billets 1 below the periphery of the bundle 3.

It will be understood that, in the manner taught in U.S. Pat. No. 3,740,985, the gripping elements are surrounded upstream of die 4 by a pressure cylinder (not shown) whereby a normal pressure gradient increasing toward die 4 and indicated diagrammatically by arrows of increasing length in FIG. 5, is applied to the bundle 3.

In the foregoing manner, axial and normal stress gradients, increasing toward die 4 to a value above the yield strength of the billet material, are built up in bundle 3 as the said bundle 3 is advanced, by frictional or viscous drag force along its surface, toward and through die 4, each billet 1 entering its respective die aperture 5 and being deformed therein to produce a wire 8. Wires 8 thereafter may be passed through a rounding die, thereby to deform said wires 8 to a circular transverse cross-section.

Bundle 3 is shown in FIG. 1 as being constituted by seven billets 1, and die 4 is shown in FIG. 2 as having seven die apertures 5, whereby to simultaneously produce seven wires 8 shown in FIG. 3. It will be understood that the hexagonal billets 1 may be assembled in greater or lesser numbers and in varying arrangements as hereinafter described, to form bundle 3, and that die 4 will have as many die apertures 5 as there are billets 1 in bundle 3.

Figure 6:
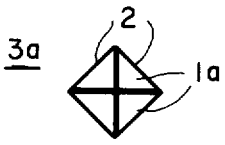
FIG. 6 represents a transverse section of a bundle of triangular billets individually coated with a shear transmitting medium, which bundle may be extruded according to the principles of the present invention.
Figure 7:
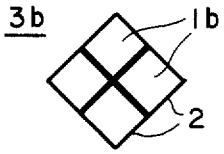
FIG. 7 represents a transverse section of a bundle of square billets individually coated with a shear transmitting medium, which bundle may be extruded according to the principles of the present invention.

It is also possible to use regular polygonal billets 1 having other than a hexagonal transverse cross-section and achieve close regular packing as hereinabove described. Thus, as shown in FIG. 6, a bundle 3a may be formed from four billets 1a each having an equilateral triangular transverse cross-section, the said billets 1a being individually coated with shear transmission medium 2, and the die through which bundle 3a is extruded will have four triangular die apertures. As shown in FIG. 7, a bundle 3b may, be formed from four billets 1b each having a square transverse cross-section, the said billets 1b being individually coated with shear transmission medium 2, and the die through which bundle 3b is extruded will have four square die apertures.

In each of the foregoing, it will be seen that the coating 2 of shear transmitting medium between facing surfaces of the billets 1a, 1b, inwardly of the periphery of the bundle 3a, 3b will be of uniform thickness, and the coating 2 of shear transmitting medium on the peripheral surfaces of bundles 3a, 3b will be approximately half of said thickness.

When the final wire product is to have a circular transverse cross-section, it is preferred that the regular polygonal billets have a greater number of transverse faces than the triangular or square billets 1a and 1b, respectively shown in FIGS. 6 and 7, because the greater the number of transverse faces in the regular polygon, the closer the transverse section of the product will approach a circle, and the easier it will be to round the said product in a rounding die to a perfect circular transverse cross-section. For this reason, in making circular wire, billets 1 of regular hexagonal transverse cross-section are to be preferred over billets 1a and 1b of triangular or square transverse cross-section.

Figure 8:
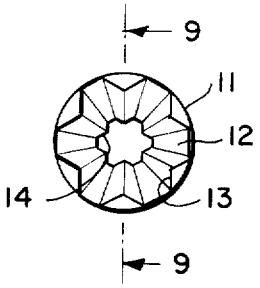
FIG. 8 represents a view in front elevation of another form of die, from the upstream or entrance end thereof, adapted to extrude the bundle of billets shown in FIG. 1.

In an alternative embodiment shown in FIG. 8, die 11 has a single die aperture 12 extending therethrough, the inlet end 13 of the said die aperture 12 having a polygonal outline registering with the transverse polygonal profile of the shear transmitting medium coated bundle 3, and the outlet end 14 of the said die aperture 12 having a similar, but smaller, polygonal outline. The said die aperture 12 exhibits in transverse section, from its inlet end 13 to its outlet end 14, a similar, but progressively smaller, polygonal outline.

Bundle 3, surrounded by gripping element segments 9 in the manner aforesaid is advanced to and extruded through die aperture 12 of die 11. It has been found that each hexagonal billet 1 of the bundle 3 is reduced, when passed through die aperture 12, by the same amount to a hexagonal wire of the same transverse dimensions as the other hexagonal wires, the coating 2 of shear transmitting medium preventing the hexagonal billets 1 from being welded to each other in passing through the die aperture.

Die 11 has been designed to reduce a bundle 3 of seven hexagonal billets 1 as shown in FIG. 1. It will be understood that the bundle 3 may be constituted by a greater or lesser number of hexagonal billets 1, in which event the polygonal outline of the aperture 12 will be modified so as to register with the transverse polygonal profile of the billet 3 being extruded therethrough.

Further, it will be understood that the bundle may be constituted by billets having a regular polygonal transverse cross-section other than hexagonal, for example, triangular or square as shown in FIGS. 6 and 7, in which event the polygonal outline of the die aperture 12 will be modified as hereinabove described, although if the final wire product is to have a circular cross-section, the regular hexagonal billet 1 is to be preferred over the triangular billet 1a or the square billet 1b.

Figure 9:
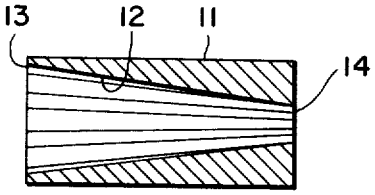
FIG. 9 represents a medial longitudinal section taken along the line 9—9 of FIG. 8.
Figure 10:
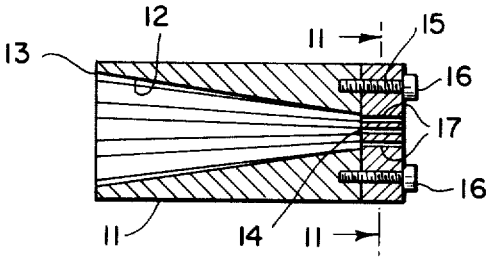
FIG. 10 represents a medial longitudinal section of the die shown in FIG. 8, together with a finishing die at the exit or downstream end of the main die, the finishing die having a plurality of circular apertures extending therethrough, each circular aperture receiving one of the hexagonal wires produced by the main die and rounding its respective wire to impart thereto a circular transverse cross-section.

As shown in FIGS. 10 and 11, a rounding die 15 may be secured by means of threaded bolts 16 to the exit end of die 11 of FIGS. 8 and 9, the said rounding die 15 being provided with a plurality of circular die apertures 17, one for each of the polygonal wires produced by extruding bundle 3 through die 11, each circular die aperture 17 being positioned appropriately to receive its respective wire from die 11, whereby to round the said polygonal wires to a circular transverse cross-section. Similarly, a rounding die 15 may be secured to the exit end of die 4 of FIG. 2.

FIGS. 12, 13 and 14 show some alternate arrangements of regular hexagonal billets 1, each individually coated with shear transmitting medium 2, in bundles 3c and 3d containing fewer billets than, and bundle 3e containing more billets than, bundle 3 of FIG. 1, which bundles 3c, 3d and 3e may be extruded according to the principles of the present invention as hereinbefore described, through dies similar to die 4 of FIG. 2 and die 11 of FIGS. 8–11, to produce simultaneously multiple extruded products such as wires 8.

FIG. 15 shows, diagrammatically, a layout of equipment for simultaneously producing multiple extruded product such as wire. Billets 1, of circular transverse cross-section, are coiled on supply reels 18 (three of which are illustrated although it will be understood that there is one supply reel 18 for each billet 1 in bundle 3f). Hydrostatic extruder 19, preferably of the type described and shown in U.S. Pat. No. 3,740,985, has therein a die-stem-supported die 20 with a circular die aperture 21 extending therethrough and gripping element segments 22 moving around endless paths and applying, through the coating of shear transmitting medium around the individual billets 1, a frictional or viscous drag force along the surface of bundle 3f toward the die 20, thereby to uncoil billets 1 from their respective reels 18 and to advance said bundle 3f against and through the said die 20. In passing from their respective reels 18 to the extruder 19, each billet 1 proceeds through a coating and hexagonal die station 23 at which a regular hexagonal transverse cross-section is imparted to the billet 1 and a coating medium of shear transmitting medium is applied around the entire peripheral surface of the said billet 1, thence through a bundling station 24 at which all the shear transmitting medium coated hexagonal billets 1 are assembled into bundle 3f, and thence through a rounding die 25 having a circular aperture therethrough in which the polygonal outline of the bundle 3f, which may for example resemble that of the bundle 3 shown in FIG. 1, is rounded to a circular transverse cross-section as shown in FIG. 16. After extrusion through die 20 of extruder 19, the multiple wires 26 exiting the extruder 19, each with a non-circular transverse cross-section, are drawn through a rounding die 27 having a plurality of circular die apertures therethrough thereby to impart a circular transverse cross-section to the said wires 26, which thereafter may be wound on individual take-up reels 28 (three of which are shown, although it will be understood that there is one take-up reel 27 for each wire 27). Alternatively, for some product purposes, the wires 26 may be wound on a single take-up reel.

Dies 4 and 11 hereinabove disclosed have been described in association with extrusion apparatus of the type shown in U.S. Pat. No. 3,740,985. It should be understood that these dies are capable of use in other types of extrusion or drawing apparatus whereby billet material coated with an appropriate lubricant may be operated upon to produce simultaneously plural products.

What is claimed is:

[1. Method of simultaneously producing a plurality of elongated products from billet material, said method comprising:

a. coating the billet material with die lubricating material; and b. passing the coated billet material through a die having a plurality of die apertures extending therethrough in such manner that the billet material and the die lubricating material are substantially evenly distributed to all of said die apertures, whereby each die aperture is lubricated by the die lubricating material and the billet material is deformed in passing through the die apertures to produce simultaneously a plurality of elongated products therefrom.]

2. Method as in claim [1] *58*, wherein:

[c] *e*. the die lubricating material is wax.

[3. Method of simultaneously producing a plurality of elongated products from billet material, said method comprising:

a. coating the billet material with shear transmitting medium capable of lubricating a die;

b. applying force along the surface of the coating of shear transmitting medium on said billet material toward the entrance end of a die having a plurality of die apertures extending therethrough thereby to apply frictional drag force along the surface of the billet material toward the entrance end of the die;

c. advancing said billet material by means of said frictional drag force against said die in such manner that the billet material and the coating of shear transmitting medium thereon are substantially evenly distributed to all of said die apertures, whereby each die aperture is lubricated by the said shear transmitting medium and the billet material is deformed in passing through the said die apertures to produce simultaneously a plurality of elongated products therefrom.]

4. Method as in claim [3] *59*, wherein:

[d] *e*. the [shear transmitting medium] *die lubricating material* is wax.

5. Method of simultaneously producing a plurality of elongated products, said method comprising:

a. coating each of a plurality of elongated billets with die lubricating material;

b. assembling said plurality of coated elongated billets in the form of a bundle *with effective surface engagement between adjacent coated elongated billets included in the bundle;* c. [passing] *applying a frictional drag force along the outer periphery of* the bundle of coated elongated billets [through] *in the direction of* a die having a plurality of die apertures extending therethrough [in] such [manner] that *said effective surface engagement between adjacent coated elongated billets included in the bundle will cause each of said billets to advance toward a different one of said die apertures with* each die aperture [receives] *receiving* one of said coated elongated billets and [is] *being* lubricated by the die lubricating material thereon, thereby deforming said billets in said die apertures to produce simultaneously a plurality of elongated products therefrom.

6. Method as in claim 5, wherein:

d. the die lubricating material is wax.

7. Method as in claim 5, wherein:

d. in performing step (b), the billets are assembled so that the thickness of the die lubricating material between adjacent surfaces of adjacent billets in the bundle is substantially uniform.

8. Method as in claim 5, wherein:

d. the transverse cross-sections of the elongated billets are regular polygons;

e. in performing step (b), the billets are assembled so that adjacent surfaces of adjacent billets in the bundle are parallel to each other.

9. Method as in claim 8, wherein:

f. in performing step (c), each coated elongated billet is passed through a die aperture having a polygonal transverse cross-section substantially registering at its entrance end with the transverse cross-section of its respective billet and decreasing in size toward its exit end.

10. Method as in claim 9, wherein:

g. the transverse cross-sections of the elongated billets and the die apertures are regular hexagons.

11. Method as in claim 9, wherein:

g. the transverse cross-sections of the elongated billets and the die apertures are equilateral triangles.

12. Method as in claim 9, wherein:

g. the transverse cross-sections of the elongated billets and the die apertures are squares.

13. Method of simultaneously producing a plurality of elongated products, said method comprising:

a. coating each of a plurality of elongated billets with shear transmitting medium capable of lubricating a die;

b. assembling said plurality of coated elongated billets in the form of a bundle *with effective surface engagement between adjacent coated elongated billets included in the bundle;* c. applying *a frictional drag* force along the peripheral surface of the coating of shear transmitting medium on said bundle toward the entrance end of a die having a plurality of die apertures extending therethrough [thereby to apply frictional drag force along the surfaces of all of the elongated billets in the bundle];

d. advancing said bundle by means of said frictional drag force against said die, *said effective surface engagement between adjacent coated elongated billets included in the bundle causing all of said billets to advance together,* in such manner that each die aperture receives one of said coated elongated billets and is lubricated by the coating of shear transmitting medium thereon, thereby deforming said billets in said die apertures to produce simultaneously a plurality of elongated products therefrom.

14. Method as in claim 13, wherein:

e. the shear transmitting medium is wax.

15. Method as in claim 13, wherein:

e. in performing step (b), the billets are assembled so that the thickness of the shear transmitting medium between adjacent surfaces of adjacent billets in the bundle is substantially uniform.

16. Method as in claim 13, wherein:

e. the transverse cross-sections of the elongated billets are regular polygons;

f. in performing step (b), the billets are assembled so that adjacent surfaces of adjacent billets in the bundle are parallel to each other.

17. Method as in claim 16, wherein:

g. in performing step (d), each coated elongated billets is passed through a die aperture having a polygonal transverse cross-section substantially registering at its entrance end with the transverse cross-section of its respective billet and decreasing in size toward its exit end.

18. Method as in claim 16, wherein:

h. the transverse cross-sections of the elongated billets and the die apertures are regular hexagons.

19. Method as in claim 16, wherein:

h. the transverse cross-sections of the elongated billets and the die apertures are equilateral triangles.

20. Method as in claim 16, wherein:

h. the transverse cross-sections of the elongated billets and the die apertures are squares.

21. Method of simultaneously producing a plurality of elongated products, said method comprising:

a. coating each of a plurality of elongated billets, the transverse cross-sections of the elongated billets being regular polygons, with die lubricating material;

b. assembling said plurality of coated elongated billets in the form of a bundle, the billets being assembled so that adjacent surfaces of adjacent billets in the bundle are parallel to each other *with effective engagement between said adjacent billet surfaces*; and c. [passing] *applying a frictional drag force along the outer periphery of* the bundle of coated elongated billets [through] *in the direction of* a die aperture having a transverse cross-section substantially registering at its entrance end with the transverse cross-section of the bundle and decreasing in size toward its exit end [in] such [manner] that *said effective surface engagement between adjacent coated elongated billets included in the bundle will cause each of the billets to advance toward the die with all of the coated elongated billets passing simultaneously through said die aperture, with* the die aperture [is] *being* lubricated by the die lubricating material and the elongated billets [are] *being* simultaneously reduced in the die aperture to produce simultaneously a plurality of elongated products, the die lubricating material preventing the individual elongated products from welding to each other during passage through the die aperture.

22. Method as in claim 21, wherein:

d. the die lubricating material is wax.

23. Method as in claim 21, wherein:

d. in performing step (b), the billets are assembled so that the thickness of the die lubricating material between adjacent surfaces of adjacent billets in the bundle is substantially uniform.

24. Method as in claim 21, wherein:

d. the transverse cross-sections of the elongated billets are regular hexagons.

25. Method as in claim 21, wherein:

d. the transverse cross-sections of the elongated billets are equilateral triangles.

26. Method as in claim 21, wherein:

d. the transverse cross-sections of the elongated billets are squares.

27. Method of simultaneously producing a plurality of elongated products, said method comprising:

a. coating each of a plurality of elongated billets, the transverse cross-sections of the elongated billets being regular polygons, with shear transmitting medium capable of lubricating a die;

b. assembling said plurality of coated elongated billets in the form of a bundle, the billets being assembled so that adjacent surfaces of adjacent billets in the bundle are [adjacent] *parallel* to each other *with effective engagement between said adjacent billet surfaces;* c. applying *a frictional drag* force along the peripheral surface of the coating of shear transmitting medium on said bundle toward the entrance end of a die aperture having a transverse cross-section substantially registering at its entrance end with the transverse cross-section of the bundle and decreasing in size toward its exit end [thereby to apply frictional drag force along the surfaces of all of the elongated billets in the bundle]; and d. advancing said bundle by means of said frictional drag force into said die aperture, *said effective surface engagement between adjacent coated elongated billets included in the bundle causing all of said billets to advance together,* in such manner that the die aperture is lubricated by the shear transmitting medium and the elongated billets are simultaneously reduced in the die aperture to produce simultaneously a plurality of elongated products, the shear transmitting medium preventing the individual elongated products from welding to each other during passage through the die aperture.

28. Method as in claim 27, wherein:

e. the shear transmitting medium is wax.

29. Method as in claim 27, wherein:

e. in performing step (b), the billets are assembled so that the thickness of the shear transmitting medium between adjacent surfaces of adjacent billets in the bundle is substantially uniform.

30. Method as in claim 27, wherein:

e. the transverse cross-sections of the elongated billets are regular hexagons.

31. Method as in claim 27, wherein:

e. the transverse cross-sections of the elongated billets are equilateral triangles.

32. Method as in claim 27, wherein:

e. the transverse cross-sections of the elongated billets are squares.

[33. Method of simultaneously producing a plurality of elongated products, said method comprising:

a. assembling a plurality of elongated billets in the form of a bundle;

b. passing the bundle of elongated billets through a die having a plurality of die apertures extending therethrough in such manner that each die aperture receives one of said elongated billets, thereby deforming said billets in said die apertures to produce simultaneously a plurality of elongated products therefrom.]

34. Method as in claim [33] *57*, wherein:

[c] *d*. the transverse cross-sections of the elongated billets are polygons;

[d] *e.* in performing step (a), the billets are assembled so that adjacent surfaces of adjacent billets in the bundle are parallel to each other.

35. Method as in claim 34, wherein:

[e] *f.* in performing step (b), each elongated billet is passed through a die aperture having a polygonal transverse cross-section substantially registering at its entrance end with the transverse cross-section of its respective billet and decreasing in size toward its exit end.

36. Method as in claim 35, wherein:

[f] *g.* the transverse cross-sections of the elongated billets and the die apertures are regular hexagons.

37. Method as in claim 35, wherein:

[f] *g.* the transverse cross-sections of the elongated billets and the die apertures are equilateral triangles.

38. Method as in claim 35, wherein:

[f] *g.* the transverse cross-sections of the elongated billets and the die apertures are squares.

39. Method of simultaneously producing a plurality of elongated products, said method comprising:

a. assembling a plurality of elongated billets in the form of a bundle *with effective surface engagement between adjacent elongated billets included in said bundle;* b. applying a frictional drag force along the surface of the bundle toward the entrance end of a die having a plurality of die apertures extending therethrough [thereby], *said effective surface engagement between adjacent elongated billets include in said bundle serving* to advance said bundle toward said die in such manner that each die aperture receives one of said elongated billets, thereby deforming said billets in said die apertures to produce simultaneously a plurality of elongated products therefrom.

40. Method as in claim 39, wherein:

c. the transverse cross-sections of the elongated billets are polygons;

d. in performing step (a), the billets are assembled so that adjacent surfaces of adjacent billets in the bundle are parallel to each other.

41. Method as in claim 40, wherein:

e. in performing step (b), each elongated billet is passed through a die aperture having a polygonal transverse cross-section substantially registering at its entrance end with the transverse cross-section of its respective billet and decreasing in size toward its exit end.

42. Method as in claim 41, wherein:

f. the transverse cross-sections of the elongated billets and the die apertures are regular hexagons.

43. Method as in claim 41, wherein:

f. the transverse cross-sections of the elongated billets and the die apertures are equilateral triangles.

44. Method as in claim 41, wherein:

f. the transverse cross-sections of the elongated billets and the die apertures are squares.

45. A method as set forth in claim 21, further comprising:

d. altering the shape of the reduced billets by passing the reduced billets through a die having extending therethrough a plurality of apertures of a shape different from that of the reduced billets in such manner that each die aperture receives one of the reduced billets.

46. A method as set forth in claim 45, wherein:

e. step (d) is performed immediately following the performance of step (c).

47. A method as set forth in claim 21, further comprising:

d. forming elongated products of round shape by passing the reduced billets through a die having extending therethrough a plurality of circular apertures in such manner that each die aperture receives one of the reduced billets.

48. A method as set forth in claim 47, wherein:

e. step (d) is performed immediately following the performance of step (c).

49. A method as set forth in claim 24, further comprising:

e. forming elongated products of round shape by passing the reduced billets through a die having extending therethrough a plurality of circular apertures in such manner that each die aperture receives one of the reduced billets.

50. A method as set forth in claim 49, wherein:

f. step (e) is performed immediately following the performance of step (c).

51. A method as set forth in claim 27, further comprising:

e. altering the shape of the reduced billets by passing the reduced billets through a die having extending therethrough a plurality of apertures of a shape different from that of the reduced billets in such manner that each die aperture receives one of the reduced billets.

52. A method as set forth in claim 50, wherein:

f. step (e) is performed immediately following the performance of step (d).

53. A method as set forth in claim 27, further comprising:

e. forming elongated products of round shape by passing the reduced billets through a die having extending therethrough a plurality of circular apertures in such manner that each die aperture receives one of the reduced billets.

54. A method as set forth in claim 51, wherein:

f. step (e) is performed immediately following the performance of step (d).

55. A method as set forth in claim 30, further comprising:

f. forming elongated products of round shape by passing the reduced billets through a die having extending therethrough a plurality of circular apertures in such manner that each die aperture receives one of the reduced billets.

56. A method as set forth in claim 55, wherein:

g. step (f) is performed immediately following the performance of step (d).

*57. A method of simultaneously producing a plurality of elongated products from a plurality of elongated billets, comprising the steps of:*

*a. assembling the plurality of elongated billets in the form of a bundle with effective surface engagement between adjacent elongated billets included in the bundle;*

*b. aligning each of the elongated billets in the bundle with a different one of a plurality of laterally spaced apertures extending through a die; and*

*c. applying a frictional drag force along the outer periphery of the bundle of billets in the direction of an entrance end of the die such that the effective surface engagement between adjacent elongated billets included in the bundle will cause each of the billets to*

*advance toward its respective aligned die aperture as a part of the bundle and then to pass through said respective aligned die aperture, whereby a plurality of elongated products will be produced simultaneously.*

*58. A method of simultaneously producing a plurality of elongated products from a plurality of elongated billets, comprising the steps of:*

*a. coating each of the elongated billets individually with die lubricating material;*

*b. assembling the coated elongated billets in the form of a bundle with effective surface engagement between adjacent coated elongated billets included in the bundle;*

*c. aligning each of the coated elongated billets in the bundle with a different one of a plurality of apertures extending through a die; and*

*d. applying a frictional drag force along the outer periphery of the bundle of billets in the direction of an entrance end of the die such that the effective surface engagement between adjacent coated elongated billets included in the bundle will cause each of the billets to advance toward its respective aligned die aperture as a part of the bundle and then to pass through said respective aligned die aperture, whereby a plurality of elongated products will be produced simultaneously.*

*59. A method of simultaneously producing a plurality of elongated products, each elongated product having a like, transverse cross-section in the form of a relatively small, first regular polygon, from a plurality of elongated billets, each elongated billet having a like, transverse cross-section in the form of a relatively large, second regular polygon, said first and second regular polygons having a like number of sides, comprising the steps of:*

*a. coating each of the elongated billets individually with die lubricating material;*

*b. assembling the coated elongated billets in the form of a bundle of regular polygons, with adjacent surfaces of adjacent coated elongated billets in the bundle in effective engagement with one another while extending in parallel to one another;*

*c. aligning the bundle of coated elongated billets with a die aperture, extending through a die and being so shaped at an entrance end thereof as to register substantially with the outer periphery of a transverse cross-section of the bundle, the die aperture decreasing in size toward an exit end of the die; and*

*d. applying a frictional drag force along the outer periphery of the bundle of coated elongated billets in the direction of the entrance end of the die such that the effective surface engagement between adjacent coated elongated billets included in the bundle will cause each of the billets to advance toward the die with all of the coated elongated billets passing simultaneously through the die aperture, with the die aperture being lubricated by the die lubricating material and the coated elongated billets being simultaneously reduced in the die aperture so as to produce a plurality of elongated products, each having a transverse cross-section in the form of one of said first regular polygons.*

* * * * *